US007522305B2

(12) United States Patent
Joo

(10) Patent No.: US 7,522,305 B2
(45) Date of Patent: Apr. 21, 2009

(54) IMAGE PRINTING APPARATUS AND A WHITE LINE COMPENSATION METHOD THEREFOR

(75) Inventor: Doo-sik Joo, Yogin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1051 days.

(21) Appl. No.: 10/670,334

(22) Filed: Sep. 26, 2003

(65) Prior Publication Data

US 2004/0061875 A1 Apr. 1, 2004

(30) Foreign Application Priority Data

Sep. 30, 2002 (KR) ...................... 10-2002-0059353

(51) Int. Cl.
*G06K 15/16* (2006.01)

(52) U.S. Cl. ....................... 358/1.8; 358/1.12; 358/488; 358/498

(58) Field of Classification Search ................ 358/1.15, 358/1.8, 475, 1.12, 488, 498, 1.18; 347/104, 347/15, 19, 9; 399/45, 372; 400/582, 232
See application file for complete search history.

(56) References Cited

U.S. PATENT DOCUMENTS 5,372,439 A * 12/1994 Poole et al. ................. 400/232
5,951,180 A 9/1999 Kawaura
5,957,599 A 9/1999 Yamada (Continued)

FOREIGN PATENT DOCUMENTS

JP 2002-254736 9/2002

OTHER PUBLICATIONS

Chinese Office Action dated Aug. 5, 2005 for App. No. 03164928.9 (9pgs).

(Continued)

*Primary Examiner*—Edward L Coles
*Assistant Examiner*—Satwant K Singh
(74) *Attorney, Agent, or Firm*—Staas & Halsey LLP

(57) ABSTRACT

An image printing apparatus including at least one pair of feeding rollers disposed in pairs in a vertical direction at a predetermined interval to feed a sheet of recording paper picked up by a pickup roller along a sheet feeding path; a document position sensor to detect whether the sheet of paper picked up by the pickup roller reaches a set reference position; a storage unit to store an information about the position of the sheet of paper at which a white line would be produced where the storage unit stores the information by sheet size; a printing part to print an image as the sheet is fed into a printing area; and a control unit to control a feeding rate of the feeding rollers using the information stored in the storage unit regarding the white line producing position of the sheet of paper where the sheet of paper is fed at an initially set feeding rate starting from the time when the sheet of paper is detected to have reached at the reference position by the document position sensor until the time when the white line would be produced, and the sheet of paper is fed at a different feeding rate from the initially set feeding rate starting form the time when the white line would be produced on the sheet. Accordingly, the producing of white line is prevented, and printing quality improves.

19 Claims, 4 Drawing Sheets

U.S. PATENT DOCUMENTS 6,151,478 A * 11/2000 Katsuta et al. .............. 399/372
6,314,252 B1 * 11/2001 Matsumoto .................. 399/45
6,540,419 B2 * 4/2003 Plumley et al. ............. 400/582
6,741,372 B1 * 5/2004 Murakami .................. 358/475
6,824,239 B1 * 11/2004 Hanabusa et al. ............. 347/15
6,843,547 B2 * 1/2005 Adkins et al. ................. 347/19
6,926,381 B2 * 8/2005 Hanabusa et al. .............. 347/9
2002/0126192 A1 * 9/2002 Kawaguchi et al. ......... 347/104

OTHER PUBLICATIONS

European Search Report issued May 8, 2007 in corresponding European Patent Application No. 03256143.3-2304.

* cited by examiner

IMAGE PRINTING APPARATUS AND A WHITE LINE COMPENSATION METHOD THEREFOR

CROSS-REFERENCE TO RELATED APPLICATIONS

This application claims the benefit of Korean Application No. 2002-59353, filed Sep. 30, 2002, in the Korean Intellectual Property Office, the disclosure of which is incorporated herein by reference.

BACKGROUND OF THE INVENTION

1. Field of the Invention

An aspect of the present invention relates to an image printing apparatus and a white line compensation method therefor, and more particularly, to an image printing apparatus and a white line compensation method therefor that compensates for white lines produced at the rear portion of a sheet of recording paper when the sheet comes out of a feeding roller.

2. Description of the Related Art

In general, a facsimile machine, a printer, a multi-function machine that comprises multiple functions of a facsimile machine and a printer in one device, or other similar units are manufactured to have a printing function in common, and thus, are equipped with an image printing apparatus to complete a printing function.

Such an image printing apparatus is classified as an inkjet printer or a laser printer based on the printing method of a printing engine.

The inkjet printer has an ink cartridge in which plural nozzles are formed to fire ink, and an ink cartridge driving circuit to drive the ink cartridge in order to form an image on a recording sheet of paper in response to a printing command.

FIG. 1 is a cross-sectioned view schematically showing a conventional inkjet printer.

As shown in FIG. 1, an inkjet printer includes: a pickup roller 120 to pick up recording sheets of paper P loaded in a paper supply cassette 110; a paper feeding part 130 disposed at a predetermined interval to feed a sheet of paper P picked up by the pickup roller 120; a printing part to carry out printing operations; and a paper discharge part 140 to externally discharge a printing-completed recording sheet of paper P.

According to a printing process of the inkjet printer structured as above, a recording sheet of paper P loaded in the paper supply cassette 110 is picked up by the pickup roller 120. The picked-up sheet of paper P is placed in a printing area along a sheet feeding path 100 by the paper feeding part 130. If the sheet of paper P is fed into a printing area, the ink cartridge 150 fires ink on the sheet of paper P fed and forwards the sheet of paper P to carry out the printing job, reciprocating the printer head (not shown) to the left and right.

Consequently, the sheet of paper P on which an image is printed by the ink cartridge 150 is externally discharged along a paper discharge direction by the paper discharge part 140. As a result, a white line is produced due to a backlash phenomenon of a feeding roller 130*a* at the time the feeding sheet of paper P goes out of the feeding roller 130*a* and the friction roller 130*b* of the paper feeding part 130 disposed at a position where the feeding sheet of paper P enters the printing area.

That is, as shown in FIG. 1, in case the rear portion of the sheet of paper P moves from position a to position b, in other words, during the time the sheet of paper P moves out from between the feeding roller 130*a* and the friction roller 130*b*, the sheet of paper P is overfed as much as the sheet of paper P is fed by the paper feeding part 130 and the paper discharge part 140. Accordingly, a problem occurs since a white line is produced as, denoted A in FIG. 2, on the rear portion of the sheet of paper P, resulting in deterioration of the printing quality.

SUMMARY OF THE INVENTION

Accordingly, it is an aspect of the present invention to provide an image printing apparatus and a white line compensation method therefor capable of controlling a feeding amount of a sheet of a paper in consideration of a position at which a white line is produced depending upon a size the sheet of paper, to compensate the printing quality.

The foregoing and/or other aspects of the present invention are achieved by providing: an image printing apparatus that includes at least one pair of feeding rollers disposed in pairs in a vertical direction at a predetermined interval to feed a sheet of recording paper picked up by a pickup roller along a sheet feeding path; a document position sensor to detect whether the sheet picked up by the pickup roller reaches a set reference position; a storage unit to store information about the position of the sheet at which a white line would be produced wherein the storage unit stores the information regarding sheet size; a printing part to print an image as the sheet is fed into a printing area; and a control unit to control a feeding rate of the feeding rollers using the information stored in the storage unit regarding the white line producing position of the sheet, wherein the sheet is fed at an initially set feeding rate starting when the sheet is detected to have reached the reference position via the document position sensor until the time the white line would be produced, and then the sheet is fed at a different feeding rate from the initially set feeding rate starting from the time when the white line would be produced on the sheet of paper.

Additional aspects and advantages of the invention will be set forth in part in the description which follows and, in part, will be obvious from the description, or may be learned by practice of the invention.

The control unit stops driving the feeding rollers for a predetermined period of time starting from the time when the white line would be produced on the sheet of paper.

The control unit controls the feeding rate of the feeding rollers such that the sheet of paper is fed at a feeding rate of the feeding rollers less than the initially set feeding rate for a predetermined period of time starting from the time when the white line would be produced on the sheet of paper.

According to an aspect of the present invention, a white line compensation method of an image printing apparatus having a pickup roller comprises: at least one pair of feeding rollers disposed in pairs at a predetermined interval in a vertical direction to feed a sheet of paper picked up by the pickup roller along a set sheet feeding path; a storage unit to store information about the position of the sheet of paper at which a white line would be produced, the storage unit to store the information by sheet size; and a printing part to print an image as the sheet of paper is fed into a printing area, which includes the operation of being input in accordance with the information on sheet sizes of the sheet of paper, feeding along the set sheet feeding path the sheet of paper picked up by the pickup roller, detecting whether the sheet of paper reaches a set reference position, and upon determining that the sheet of paper reaches the set reference position, controlling a sheet feeding rate by using the information on positions at which the white line would be produced depending on the sheet size information.

The control operation stops driving the feeding rollers for a predetermined period of time starting from the time when the white line would be produced on the sheet of paper.

The control step feeds the sheet of paper at a feeding rate of the feeding rollers less than the initially set feeding rate for a predetermined period of time starting from the time when the white line would be produced on the sheet of paper.

BRIEF DESCRIPTION OF THE DRAWINGS

The above and/or other aspects and advantages of the invention will become apparent, and more readily appreciated from the following description of the preferred embodiment, taken in conjunction with accompanying drawings, of which.

DETAILED DESCRIPTION OF THE PREFERRED EMBODIMENTS

Figure 1:
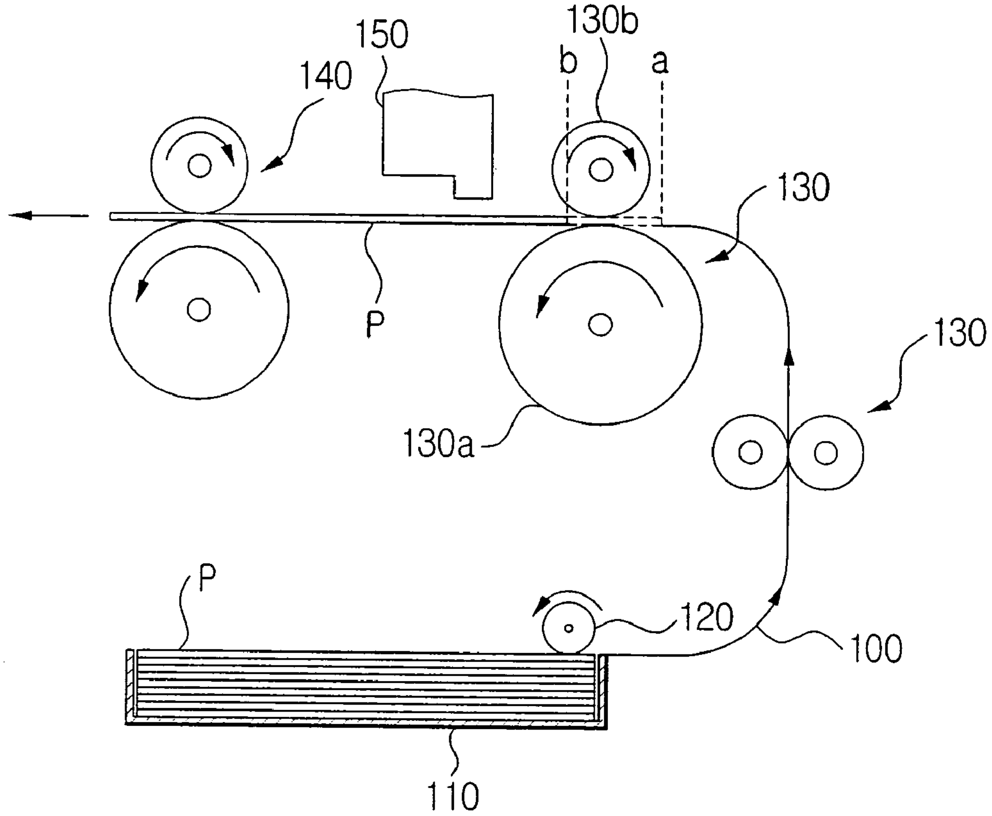
FIG. 1 (PRIOR ART)
FIG. 1 is a view of a conventional inkjet printer.
Figure 2:
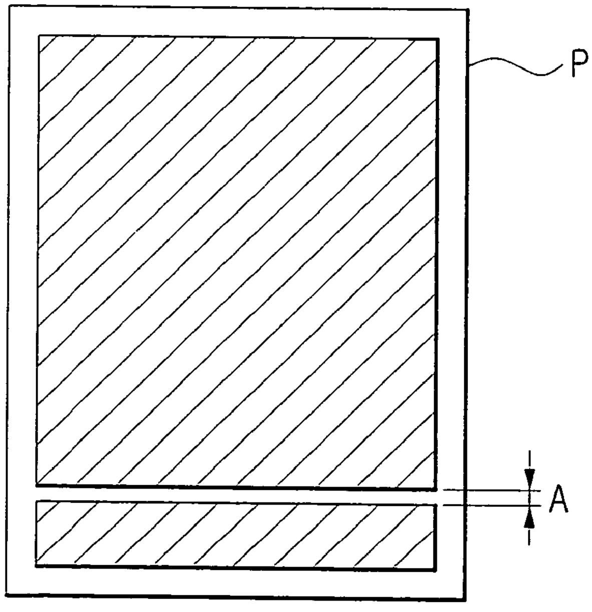
FIG. 2 (PRIOR ART)
FIG. 2 is a view for showing an illustrative image outputted in use of the inkjet printer of FIG. 1.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
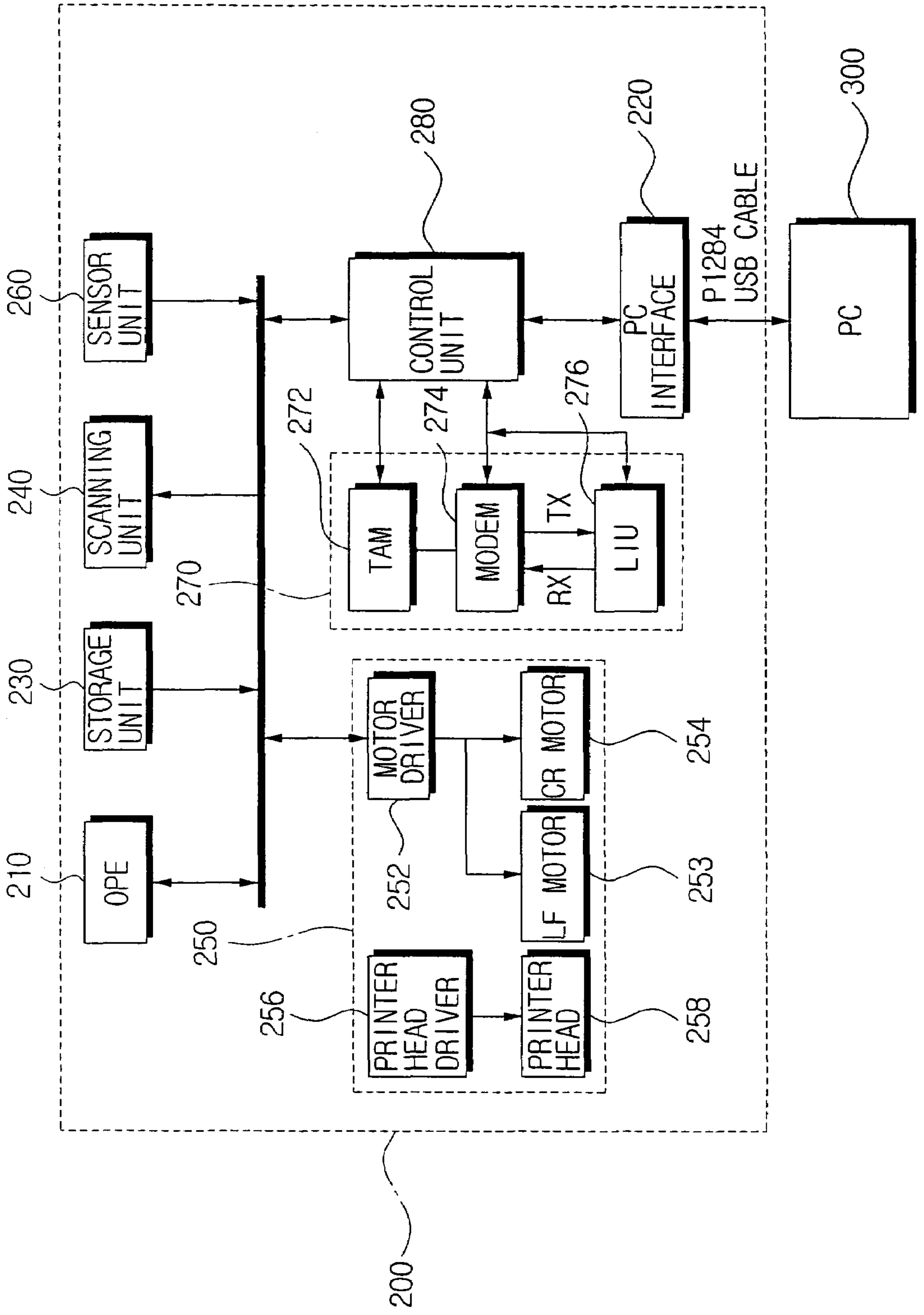
FIG. 3 is a block diagram for showing a multi-function machine having an image printing apparatus according to a preferred embodiment of the present invention.

A block diagram of a multi-function machine having an image printing apparatus according to a preferred embodiment of the present invention is shown in FIG. 3.

Referring to FIG. 3, a multi-function machine 200 according to an aspect of the present invention has an operating panel (OPE) 210, a Personal Computer (PC) interface 220, a storage unit 230, a scanning unit 240, a printing unit 250, a sensor unit 260, a facsimile unit 270, and a control unit 280.

The OPE 210 is provided with an input part (not shown) having plural function keys to support character and/or number inputs in order to enable various functions supported by the multi-function machine 200 to be set and function keys enabling information on sheet sizes to be inputted. The OPE 210 also comprises an LCD window (not shown) to indicate the operation states of the multi-function machine 200 according to the controls of the control unit 280 to be described later. The OPE 210 outputs key data generated based on the manipulation of keys provided in the input part to the control unit 280.

The PC interface 220 supports data communications between a personal computer (PC) 300 of external device and the control unit 280 through a communication interface (P1284 or USB cable). Accordingly, the PC interface 220 receives printing data transmitted from the PC 300 based on the controls of the control unit 280 and uploads to the PC 300 data read out by the scanning unit 240, which is described later, and an electric power supply state of the multifunction machine 200.

The storage unit 230 is constructed with a non-volatile memory such as a ROM to store various control programs necessary to implement the functions of the multi-function machine 200, and a volatile memory such as a DRAM to temporarily store image data read out by the scanning unit 240 based on the controls of the control unit 280, facsimile data received from the facsimile unit 270 to be described later, and printing data transmitted from the PC 300.

Further, in the storage unit 230 is stored information corresponding to a position at which a white line would be produced depending upon sheet sizes. The positions at which the white line is produced depending upon sheet sizes are fixed so that standard positions on which the white line is generated can be set.

The scanning unit 240 scans data printed on a sheet of paper like a general scanner to covert the scanned data into a format that the control unit 280 can recognize. The scanned data of the scanning unit 240 is temporarily stored in the storage unit 230. The scanned data stored in the storage unit 230 is transmitted to the printing unit 250 to print according to the controls of the control unit 280, or can be transmitted to the PC 300 through the PC interface 220.

The sensor unit 260 detects the operation states of individual peripheral devices according to the operations of the multi-function machine 200. That is, the sensor unit 260 checks if the peripheral devices such as the scanning unit 240, printing unit 250, PC interface 220, facsimile unit 270, etc., are normally operating. The checked data is transmitted to the control unit 280, and the control unit 280 indicates the data on the LCD window provided on the OPE 210. Therefore, a user can see the operation states of various peripheral devices through the LCD window.

The facsimile unit 270 includes a Telephone Answering Machine (TAM) 272 having an automatic answering function, a modem 274, and a Line Interface Unit (LIU) 276.

The modem 274 receives and transmits facsimile data from and to external devices connected to the Public Switched Telephone Network (PSTN) through the LIU 276.

The LIU 276 connects to enable mutual communications between the modem 274 and the PSTN to allow to facsimile data to be received and transmitted. The facsimile data received through the PSTN is transmitted to the control unit 140 through the modem 274 and the LIU 276.

The printing unit 250 carries out printing jobs with respect to data to be printed according to the controls of the control unit 280.

The printing unit 250 has a motor driver 252 and a printer head driver 256. The motor driver 252 drives a carriage return (CR) motor 253 and a line feed (LF) motor 254 according to the controls of the control unit 280. The CR motor 254 is driven by the motor driver 252 to transport the ink cartridge 150. The LF motor 253 is driven by the motor driver 252 to transport the sheet of paper for the recording of print data.

The printer head driver 256 drives a printer head 258 to fire ink via nozzles provided in the printer head 258, to thereby print an image on a sheet of paper. The printer head 258 is a recording head in which plural nozzles having discharge holes formed therein are arranged and driven by the printer head driver 256.

The control unit 280, if the multi-function machine 200 is turned on, controls the overall operations of the multi-function machine 200 according to a control program stored in the storage unit.

The control unit 280 checks if information regarding the size of a sheet of paper queuing to print is inputted through the input part. If the information on the sheet size is inputted, the control unit 280 uses the size information regarding the sheet size to recognize, via the storage unit 230, a position of the sheet of paper at which the white line would be produced.

A sectional view to schematically illustrate the printing unit of the multi-function machine in FIG. 3 is shown in FIG.

4. The same functions as the members shown in FIG. 1 are indicated by the same reference numerals, and duplicated descriptions will be avoided.

Figure 4:
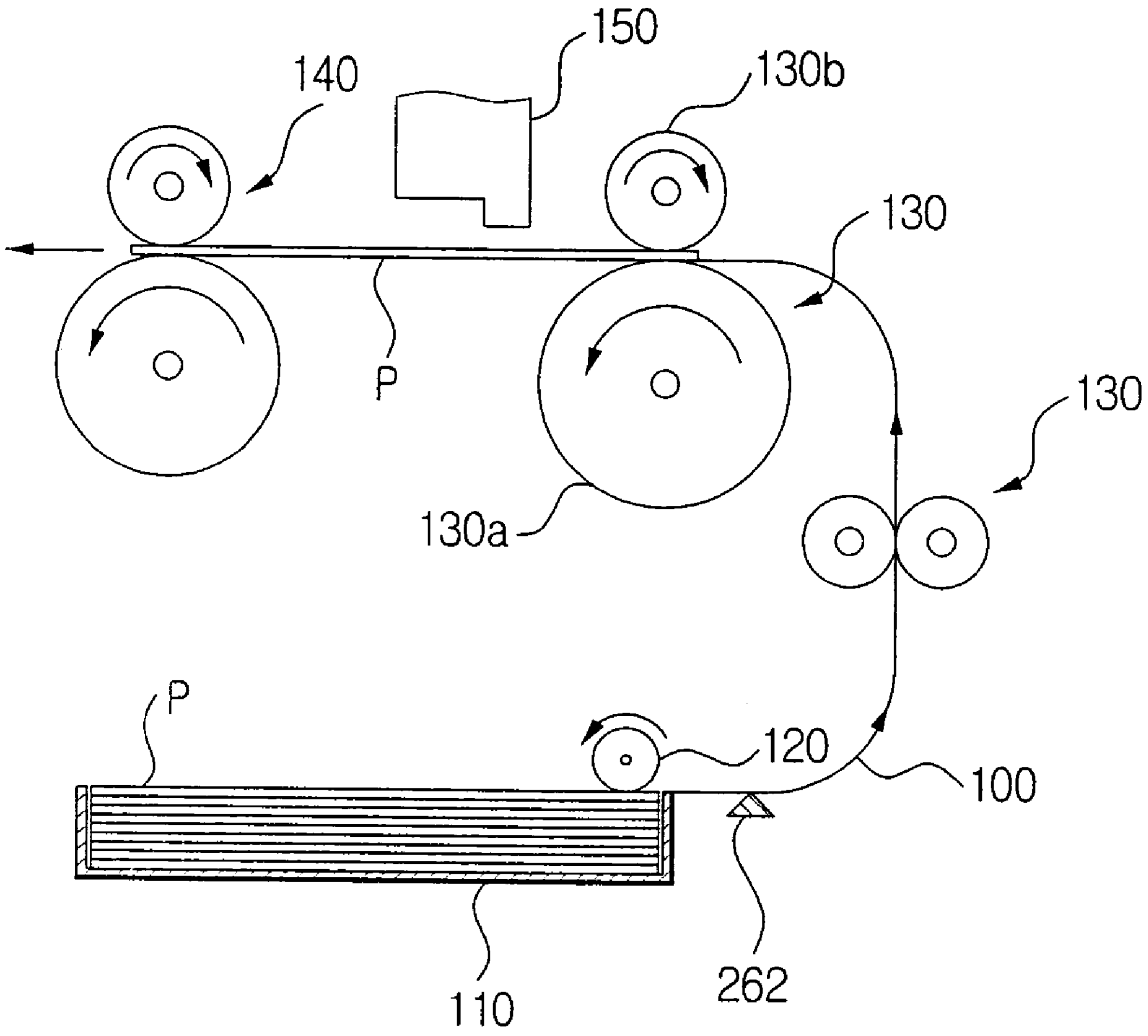
FIG. 4 is a view for schematically showing a printing unit of FIG. 3.

Referring to FIG. 4, a document position sensor 262 is disposed on the sheet feeding path 100 near a location where a sheet of paper P loaded in the paper supply cassette 110 is picked up by the pickup roller 120. The document position sensor 262 is a sensor to detect whether a sheet of paper P fed along the sheet feeding path reaches a set reference position.

If the control unit 280 receives a detection signal generated by the document position sensor 262 detecting that a sheet of paper P has reached the set reference position, the control unit 280 drives the LF motor 253 to feed the sheet of paper P to a printing position. The sheet of paper P moves along the sheet feeding path 100 set by the paper feeding part 130 rotating with the driving of the LF motor 253. The ink cartridge 150 is driven by the CR motor 254, and fires ink on the sheet of paper P while reciprocating the printer head (not shown) to the left and to the right directions to carry out printing jobs.

Further, if the control unit 280 decides through the document position sensor 262 that the sheet of paper P reaches the set reference position, the control unit 280 controls the sheet of paper P to be fed at an initially set feeding rate from the time when the sheet of paper P is detected to have reached at the set reference position to the time when the white line would be produced. The control unit 280 processes the sheet of paper P to be fed at a rate different from the initially set feeding rate for a predetermined period of time starting from the time when the white line would be produced on the sheet of paper P.

That is, the control unit 280 stops driving the LF motor 253 for a predetermined period of time starting from the time when the white line would be produced on the sheet of paper P. Alternatively, the control unit 280 controls the LF motor 253 for a predetermined period of time starting from the time when the white line would be produced on the sheet of paper P to feed the sheet of paper P at a rate less than the initially set feeding rate.

In the meantime, the control unit 280, after a predetermined period of time lapses from the time when the white line would be produced on the sheet of paper P, processes the sheet of paper P to be fed at the initially set feeding rate.

Hereinafter, a white line compensation method of a multi-function machine having the image printing apparatus according to an embodiment of the present invention will be described with reference to FIG. 5.

Figure 5:
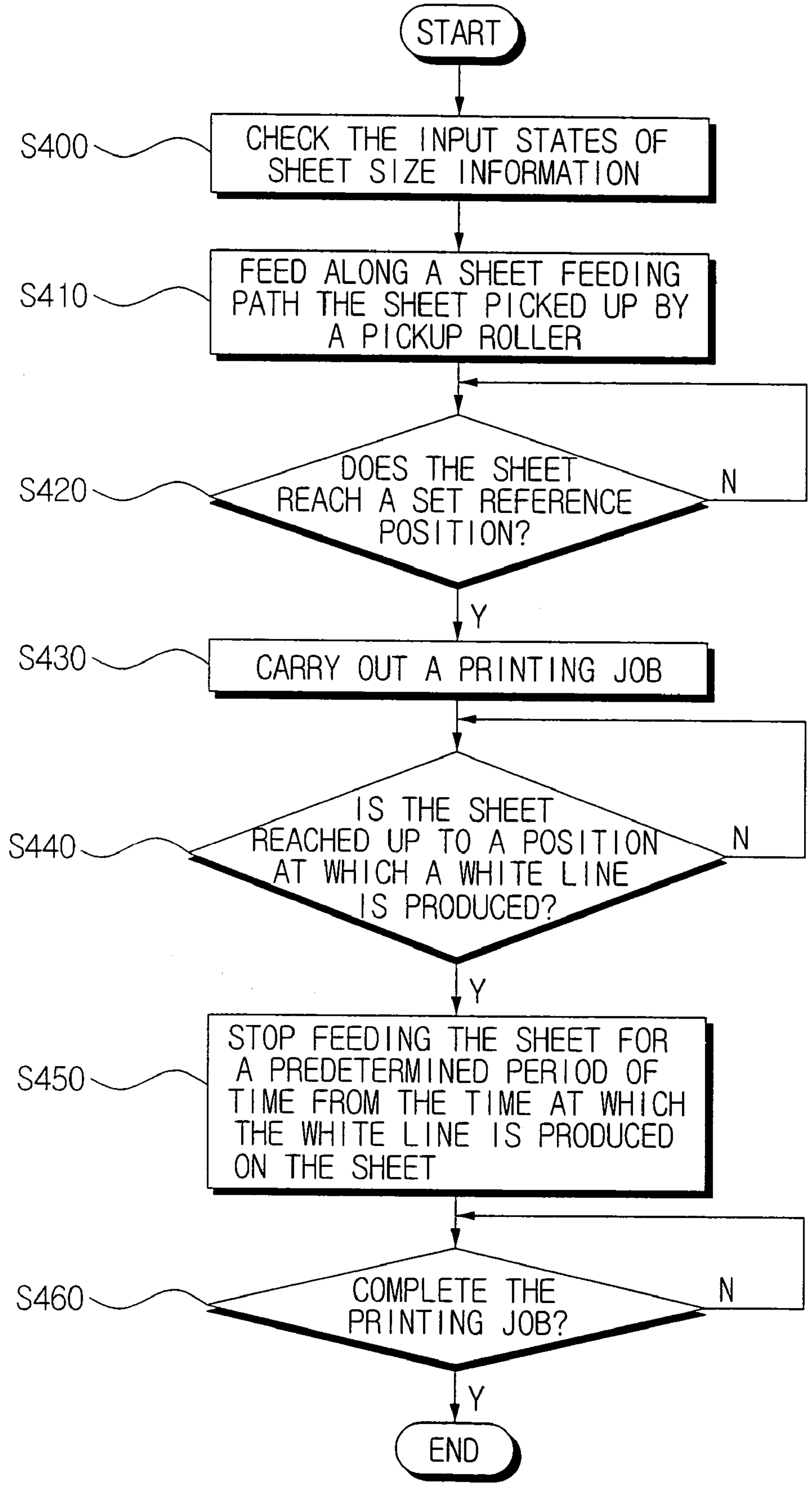
FIG. 5 is a flowchart illustrating a white line compensation method of the multi-function machine shown in FIG. 3.

Referring to FIG. 3 to FIG. 5, if the multi-function machine is powered on, the control unit 280 checks whether information regarding a size of a sheet of paper P is inputted through the OPE 210 (S400).

If the sheet size information is inputted through the OPE 210, the control unit 280 feeds along the sheet feeding path 100 the sheet of paper P picked up by the pickup roller 120 based on a printing command (S410).

The document position sensor 262 detects whether the sheet of paper P reaches a set reference position and outputs a signal of the detection result to the control unit 280. The control unit 280 decides whether a signal of the document position detection result is received from the document position sensor 262 (S420).

If the sheet of paper P is determined to have reached the reference position in the step S420, the control unit 280 drives the paper feeding part 130 at the initially set feeding rate, and carries out a printing job to print an image on the sheet of paper P being fed (S430).

In the meantime, the control unit 280 can predict the time when the white line would be produced on the sheet of paper P by using the sheet size information. Accordingly, the control unit 280 checks a printing progress state starting from the time the sheet of paper P reaches the set reference position and determines whether the sheet of paper P is fed up to the position where the white line would be produced (S440). That is, the control unit 280 decides whether the rear end portion of the sheet of paper P is fed out of the feeding roller 130*a* and the friction roller 130*b*.

If the sheet of paper P is determined to have been fed up to the position at which the white line would be produced, the control unit 280 controls the LF motor 253 for a predetermined period of time starting from the time when the white line would be produced on the sheet of paper P to stop feeding the sheet of paper P (S450).

Further, the control unit 280 stops feeding the sheet of paper P only for a predetermined period of time starting from the time when the white line would be produced on the sheet of paper P, and feeds the sheet of paper P at the initially set feeding rate after the predetermined period of time lapses, to thereby continue the printing job.

The control unit 280 determines whether the printing job is completed (S460). Upon determining that the print job is complete, the sheet of paper P, which has gone through the printing process, is externally discharged in the discharge direction of the paper discharge part 140.

As stated above, the white line produced at the time the sheet of paper P goes out of the feeding roller 130*a* and the friction roller 130*b* can be prevented by controlling the feeding rate of the sheet of paper P at the time the white line would be produced on the sheet of paper P.

As described so far, the image printing apparatus and the white line compensation method according to an aspect of the present invention uses information on positions set by sheet sizes at which the white line would be produced to control the sheet feeding rate for a predetermined period of time starting from the time when the white line would be produced on the sheet of paper, to thereby prevent the white line phenomenon so that printing quality can be enhanced.

Although few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image printing apparatus, comprising:

at least one pair of feeding rollers disposed in pairs in a vertical direction at a predetermined interval to feed a sheet of recording paper picked up by a pickup roller along a sheet feeding path;

a document position sensor to detect whether the sheet picked up by the pickup roller reaches a set reference position;

a storage unit to store information about the position of the sheet at which a white line would be produced, wherein the storage unit stores the information regarding sheet size;

a printing part to print an image as the sheet is fed into a printing area; and a control unit to control a feeding rate of the feeding rollers using the information stored in the storage unit about the white line producing position of the sheet, wherein the sheet is fed at an initially set feeding rate starting when the sheet is detected to have reached the set reference position by the document position sensor until the white line would be produced, and the sheet is fed at a different feeding rate less than the initially set feeding rate starting from the time when the white line would be produced on the sheet.

2. The image printing apparatus as claimed in claim 1, wherein the control unit stops driving the feeding rollers for a predetermined period of time starting from the time when the white line would be produced on the sheet.

3. The image printing apparatus as claimed in claim 2, wherein the control unit controls the feeding rate of the feeding rollers such that the sheet is fed at the feeding rate of the feeding rollers less than the initially set feeding rate for a predetermined period of time starting from the time when the white line would be produced on the sheet.

4. A white line compensation method of an image printing apparatus having a pickup roller, comprising:

storing information via a storage unit regarding sheet sizes of a sheet of paper and information in relation to position of the sheet of paper at which a white line would be produced;

feeding the sheet picked up by the pickup roller along a set sheet feeding path;

detecting whether the sheet reaches a set reference position; and upon detecting that the sheet has reached the set reference position, controlling a sheet feeding rate by using the information in relation to a position of the sheet at which the white line would be produced depending on the sheet size information.

5. The white line compensation method as claimed in claim 4, wherein the control operation stops driving the feeding rollers for a predetermined period of time starting from the time when the white line would be produced on the sheet.

6. The white line compensation method as claimed in claim 4, wherein the control operation feeds the sheet at a feeding rate of the feeding rollers less than the initially set feeding rate for a predetermined period of time starting from the time when the white line would be produced on the sheet.

7. The image printing apparatus as claimed in claim 1, wherein the control unit determines via the document position sensor that the sheet reaches the set reference position and controls the sheet to be fed at an initially set feeding rate when the sheet is detected to have reached at the set reference position until the time when the white line would be produced.

8. An image printing apparatus in a multi-function machine, comprising:

an operating panel to support character and/or number inputs to enable various functions supported by the multi-function machine;

an interface unit to receive printing data transmitted from an external device;

a storage unit to store information in relation to a position at which a white line would be produced in accordance with the size of a sheet of paper;

a scanning unit to scan data printed on the sheet;

a control unit to check if information regarding the size of the sheet queuing to print is input through the input part, and upon determining that information on the size of the sheet is input, the control unit uses the size information to recognize a position of the sheet at which a white line would be produced; and a sensor unit to detect operation states of individual peripheral devices in relation to the operations of the multi-function machine.

9. The image printing apparatus as claimed in claim 8, further comprising a facsimile unit, including:

a modem to receive and transmit facsimile data from and to external devices connected to a Public Switched Telephone Network; and a Line Interface Unit to enable mutual communications between the modem and the Public Switched Telephone Network.

10. The image printing apparatus as claimed in claim 8, wherein the facsimile data received through the Public Switched Telephone Network is transmitted to the control unit via the modem and the Line Interface Unit.

11. The image printing apparatus as claimed in claim 8, further comprising a printing unit, including:

an ink cartridge to fire ink on the sheet;

a carriage return motor to drive the ink cartridge;

a line feed motor to transport the sheet to record print data;

a motor driver to drive the carriage return motor and the line feed motor according to the controls of the control unit;

a printer head that reciprocates to the left and to the right directions to carry out printing jobs;

a plurality of nozzles with discharge holes provided to the printer head;

a printer head driver to drive the printer head to fire ink via the nozzles.

12. The image printing apparatus as claimed in claim 11, further comprising:

a document position sensor to detect whether the sheet fed along a sheet feeding path reaches a set reference position; and a control unit to drive the line feed motor.

13. The image printing apparatus as claimed in claim 12, wherein the control unit stops driving the line feed motor for a predetermined period of time starting from the time when the white line would be produced on the sheet.

14. The image printing apparatus as claimed in claim 12, wherein the control unit controls the line feed motor for a predetermined period of time starting from the time when the white line is produced on the sheet to feed the sheet at a rate less than an set initially feeding rate.

15. The image printing apparatus as claimed in claim 1, wherein the control unit predicts the time when the white line is produced on the sheet by using the sheet size information.

16. The image printing apparatus as claimed in claim 1, wherein the control unit continues to feed the sheet at the initially set feeding rate after the predetermined period of time lapses.

17. A white line compensation method of an image printing apparatus, comprising:

detecting whether a sheet of paper fed along a sheet feeding path reaches a set reference position;

driving the sheet along the sheet feeding path upon determining that the sheet has reached the set reference position in accordance with an initially set feeding rate; and decreasing the initially set feeding rate for a predetermined period of time starting from a time when the white line would be produced on the sheet; and jetting ink upon the sheet via an ink cartridge when the sheet reaches a printing area.

18. The white line compensation method as claimed in claim 17, further comprising stopping feeding of the sheet of paper for a predetermined period of time starting from the time when the white line would be produced on the sheet of paper.

19. The white line compensation method as claimed in claim 17, wherein after a predetermined period of time lapses, the sheet of paper is fed in accordance with the initially set feeding rate.

* * * * *